(12) United States Patent
Joshi et al.

(10) Patent No.: US 12,479,280 B1
(45) Date of Patent: Nov. 25, 2025

(54) VEHICLE PROTECTION APPARATUS

(71) Applicants: Shailendra Joshi, Ho Ho Kus, NJ (US); Vidur Joshi, Ho Ho Kus, NJ (US)

(72) Inventors: Shailendra Joshi, Ho Ho Kus, NJ (US); Vidur Joshi, Ho Ho Kus, NJ (US)

( * ) Notice: Subject to any disclaimer, the term of this patent is extended or adjusted under 35 U.S.C. 154(b) by 127 days.

(21) Appl. No.: 18/378,213

(22) Filed: Oct. 10, 2023

(51) Int. Cl.
*B60J 11/04* (2006.01)

(52) U.S. Cl.
CPC ...................... *B60J 11/04* (2013.01)

(58) Field of Classification Search
CPC ............................................ B60J 11/06
USPC .................................... 150/166, 167
See application file for complete search history.

(56) References Cited

U.S. PATENT DOCUMENTS

| | | | | | |
|---|---|---|---|---|---|
| 3,474,803 | A * | 10/1969 | Davis | ............... | E04H 6/04 135/912 |
| 4,140,191 | A * | 2/1979 | Hickey | ............... | B60J 11/00 206/524.8 |
| 4,315,535 | A * | 2/1982 | Battle | ............... | B60J 11/00 405/80 |
| 4,991,363 | A * | 2/1991 | Randmae | ............... | E04H 6/04 405/114 |
| 6,405,771 | B1 * | 6/2002 | Mote | ............... | B62J 19/00 296/136.01 |
| 6,405,862 | B1 * | 6/2002 | Allain | ............... | B63C 7/06 206/335 |
| 6,517,141 | B1 * | 2/2003 | Su | ............... | B60J 11/00 150/166 |
| 9,499,035 | B1 * | 11/2016 | Chashchukhin | ......... | B60J 11/04 |
| 10,895,092 | B2 * | 1/2021 | Rapp | ............... | E04H 6/04 |
| 2005/0151391 | A1 * | 7/2005 | Bryd | ............... | B60J 11/00 296/136.1 |
| 2006/0225822 | A1 * | 10/2006 | Chen | ............... | B60J 11/00 206/335 |
| 2007/0176462 | A1 * | 8/2007 | Lombardo | ............... | B60J 11/00 296/136.1 |
| 2008/0187255 | A1 * | 8/2008 | Griffin | ............... | B60J 11/00 383/93 |
| 2009/0008958 | A1 * | 1/2009 | Sebera | ............... | B60J 11/00 296/136.1 |

(Continued)

*Primary Examiner* — Don M Anderson
*Assistant Examiner* — Justin Caudill
(74) *Attorney, Agent, or Firm* — Gulf Coast Intellectual Property Group (57) ABSTRACT

A vehicle protection apparatus that is configured to be surroundably mounted to a vehicle wherein the present invention inhibits water entering the vehicle so as to prevent damage thereto. In one embodiment of the present invention a body is provided having a first containment member disposed within a second containment member. The body includes separable base portion and upper portion wherein the base portion and upper portion are sealably coupled to provide a watertight connection. The base portion includes tire engagement members that operable to receive vehicle tires thereon. A water removal member is present within the interior volume of the body and is configured to provide evacuation of any water that propagates into the interior volume of the body. Another embodiment of the present invention includes a mateably shaped body that is contoured to the shape of the vehicle allowing water to pass underneath.

4 Claims, 7 Drawing Sheets

(56) References Cited

U.S. PATENT DOCUMENTS

| | | | | |
|---|---|---|---|---|
| 2014/0042771 A1* | 2/2014 | Lo | ............................ | B60J 11/04 |
| | | | | 296/136.07 |
| 2015/0075685 A1* | 3/2015 | Denham | .................. | B60J 11/04 |
| | | | | 150/166 |
| 2017/0341497 A1* | 11/2017 | Garnick | .................... | B60J 11/04 |
| 2019/0100287 A1* | 4/2019 | Fisher | ...................... | B60J 11/04 |
| 2019/0337370 A1* | 11/2019 | Adams | ..................... | B60J 11/04 |
| 2020/0298693 A1* | 9/2020 | Hoffman | .................. | B60J 11/04 |

* cited by examiner

VEHICLE PROTECTION APPARATUS

FIELD OF THE INVENTION

The present invention relates generally to protective devices for vehicles, more specifically but not by way of limitation, an apparatus that is operable to surroundably mount a vehicle and protect the vehicle from flood waters wherein the present invention inhibits water from egressing into any portion of the vehicle.

BACKGROUND

Vehicular damage caused by flooding results in hundreds of millions of dollars in damage annually in the United States. While flooding is thought to be associated with catastrophic storms, there are thousands of vehicles that are flooded every year from normal precipitation events. The state of Texas in 2022 had almost seventy thousand vehicles damaged by flood waters most of which were not associated with a named storm. Florida also has a high rate of vehicular loss wherein in the state of Florida in 2022 almost thirty-five thousand vehicles were damaged by flood waters. Flood waters typically result in a total vehicle loss and costs the insurance industry billions of dollars every year.

While the areas that flood are mostly well-known, there is no technology available that can be employed to protect a vehicle from flood waters. Many times cars must be parked in streets and other areas and as such are exposed to flood waters from an intense rain event or named storm. Unless the vehicle owner has time to relocate the vehicle to higher ground, the result is a damaged vehicle that most often is deemed a total loss by the insurer of the vehicle.

Accordingly, there is a need for a vehicle protection apparatus that is configured to protect a vehicle from flood waters wherein the present invention surroundably mounts a vehicle so as to inhibit water from egressing into the vehicle and wherein the present invention further provides evacuation of water in the event of leakage.

SUMMARY OF THE INVENTION

It is the object of the present invention to provide a vehicle protection apparatus that is configured to inhibit flood waters from egressing into a vehicle wherein the present invention includes a containment member wherein the containment member includes an interior volume suitable to house a vehicle therein.

Another object of the present invention is to provide a vehicle protection device configured to be surroundably mounted to a vehicle wherein the containment member includes a base portion configured to be superposed a ground surface.

A further object of the present invention is to provide a vehicle protection apparatus that is configured to inhibit flood waters from egressing into a vehicle wherein the containment member further includes an upper portion wherein the upper portion is sealably secured around the top of the vehicle.

Yet a further object of the present invention is to provide a vehicle protection device configured to be surroundably mounted to a vehicle wherein the containment member employs closure members that are proximate the top of the vehicle disposed within the containment member.

Still another object of the present invention is to provide a vehicle protection apparatus that is configured to inhibit flood waters from egressing into a vehicle wherein the containment member includes a base portion having tire pads integrally formed therein.

An additional object of the present invention is to provide a vehicle protection device configured to be surroundably mounted to a vehicle in order to inhibit water from entering the vehicle wherein the containment member includes a first closure mechanism and a second closure mechanism deployed adjacent thereto.

Yet a further object of the present invention is to provide a vehicle protection apparatus that is configured to inhibit flood waters from egressing into a vehicle wherein an embodiment of the present invention includes a pumping system configured to remove water from the interior volume of the containment member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated a vehicle protection apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the vehicle protection apparatus 100 is configured to be surroundably mounted to a vehicle 99 so as to inhibit water from egressing into the vehicle in the event of a storm or other cause of rising water. It should be understood within the scope of the present invention that the body 10 of the vehicle protection apparatus 100 is manufactured from a suitable waterproof flexible material such as but not limited to polyethylene. It should be further understood within the scope of the present invention that the body 10 is provided in alternate sizes so as to accommodate different lengths and heights of vehicles.

Figure 1:
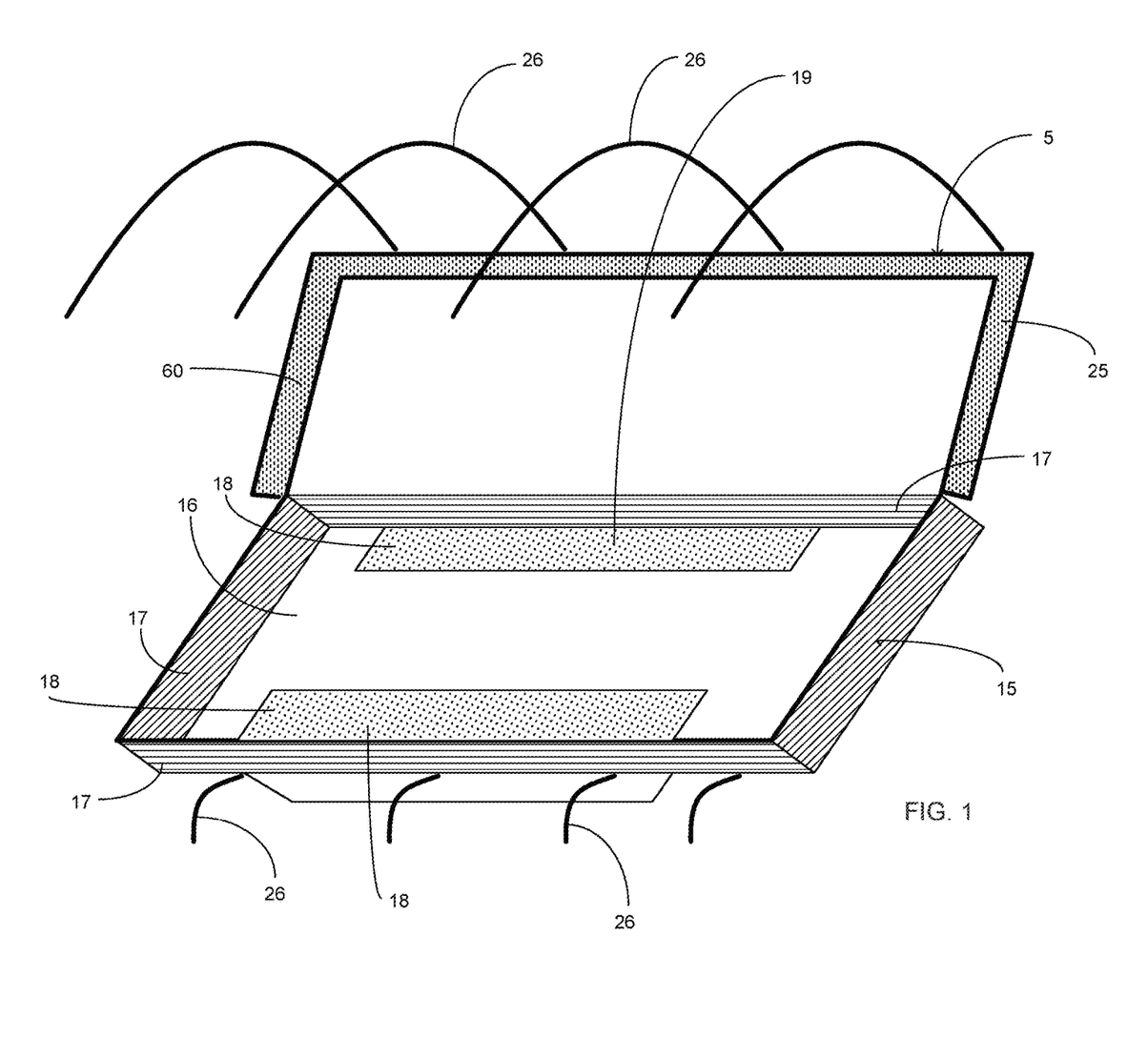
FIG. 1 is a top perspective view of an embodiment of the containment member of the present invention.
Figure 2:
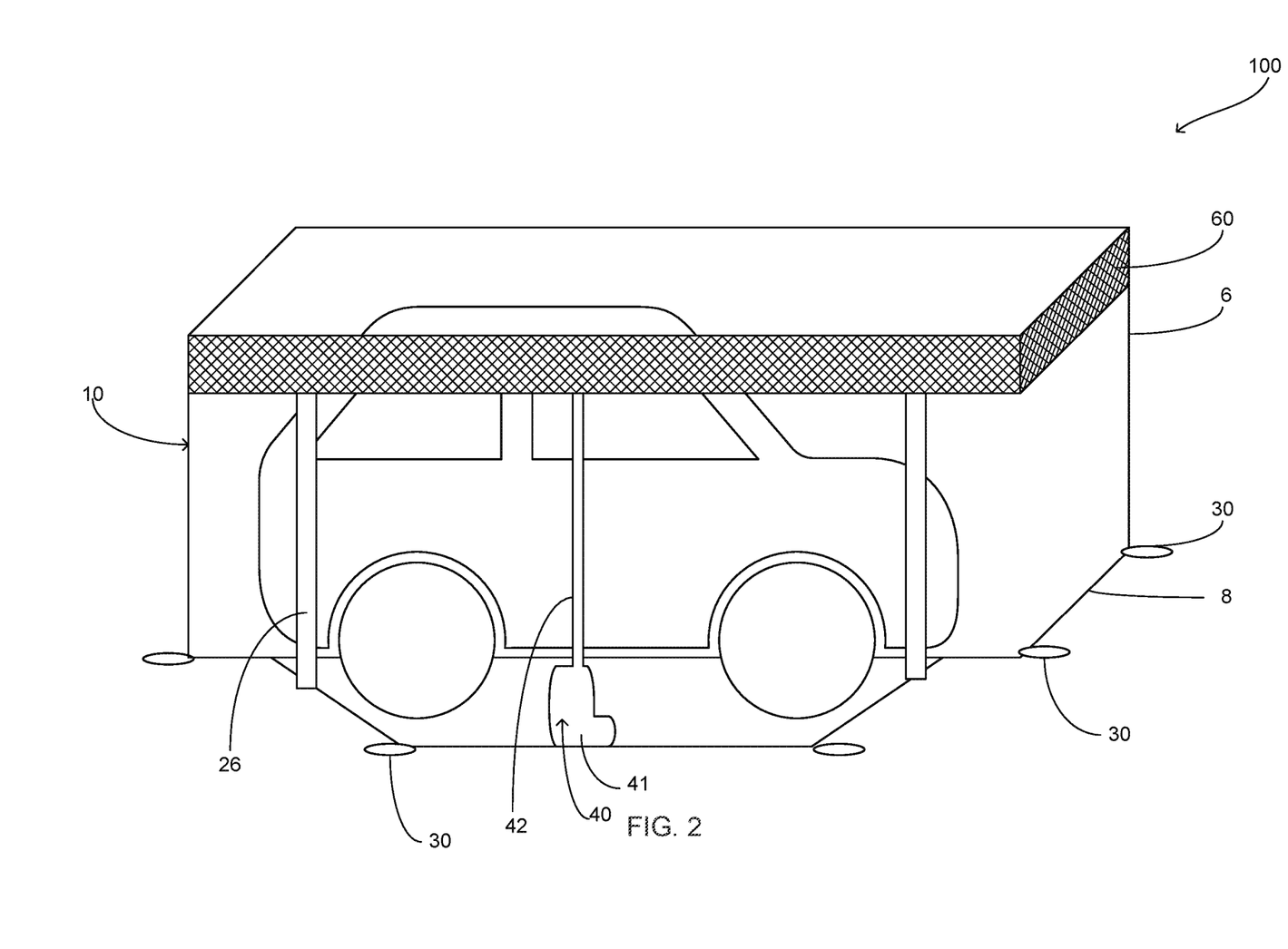
FIG. 2 is perspective view of the present invention with an exemplary vehicle disposed therein.

Referring in particular to FIG. 1 and FIG. 2 submitted as a part hereof, the vehicle protection apparatus 100 includes body 10 wherein the body 10 is comprised of a base portion 15 and upper portion 25. The base portion 15 includes bottom member 16 that is planar in manner and of suitable size to have vehicle 99 superposed thereon. The base portion 15 has integrally formed therewith wall members 17 wherein the wall members 17 are collapsible to permit the vehicle 99 to be driven onto the bottom member 16 and subsequently extended upward around the sides, front and rear of the vehicle 99. The bottom member 16 has integrally formed therewith tire engagement members 18,19 wherein the tire engagement members 18,19 are positioned on opposing sides of the bottom member 16 and are constructed to have the tires of the vehicle superposed thereon. In a preferred embodiment of the present invention the tire engagement members 18,19 are manufactured from an alternate material that has sufficient durability and heat tolerance so as to accommodate a tire superposed thereon. While the tire engagement members 18,19 are illustrated herein as being a singular construction rectangular in shape, it is contemplated within the scope of the present invention that the tire engagement members 18, 19 could be provided in alternate shapes, sizes and quantities in order to achieve the desired objective discussed herein.

In a preferred embodiment of the body 10 the body 10 is comprised of a first containment member 5 and a second containment member 6 that are adjacent to each other and of the same size. The first containment member 5 and second containment member 6 are each comprised of the aforementioned base portion 15 and upper portion 25 and the elements thereof. Providing the first containment member 5 and a second containment member 6 provides a desired structural integrity for ensuring an inability for water to egress into the vehicle. While a preferred embodiment of the present invention includes a first containment member 5 and a second containment member 6, it is contemplated within the scope of the present invention that the body 10 could be comprised of only one containment member. The first containment member 5 includes a plurality of securing members 26 wherein the securing members 26 are configured to be secured to each other subsequent the body 10 being surroundably positioned around the vehicle 99. It is contemplated within the scope of the present invention that alternate quantities of securing members 26 could be employed. Furthermore, it should be understood within the scope of the present invention that the securing members 26 could be constructed from a material such as but not limited to hook and loop straps.

The body 10 further has secured to the lower perimeter edge 8 a plurality of anchor members 30. The anchor members 30 are secured to the body 10 utilizing suitable techniques. The anchor members 30 are operable to maintain the position of the body 10 in a position such that a vehicle 99 can be driven onto the bottom member 16. It is contemplated within the scope of the present invention that the anchor members 30 could be constructed in various sizes and of various materials in order to achieve the desired objective discussed herein.

The vehicle protection apparatus 100 further includes a water removal member 40. The water removal member 40 is positioned so as to remove any water from the interior volume of the body 10 in the event water egresses thereinto. The water removal member 40 includes a pump 41 operably coupled to a hose 42 wherein the pump 41 will evacuate any water surroundably present thereto outward from the body 10 via the hose 42. The pump 41 is a conventional submersible style water pump having a float switch providing activation of the pump 41 upon the presence of a sufficient volume of water therearound. It should be understood within the scope of the present invention that the vehicle protection apparatus 100 could employ alternate sizes and styles of pumps 41. Additionally, it should be understood within the scope of the present invention that the vehicle protection apparatus 100 could employ more than one hose 42 to evacuate water from within the interior volume of the body 10. It should be understood within the scope of the present invention that the water removal member 40 is located either intermediate the first containment member 5 and second containment member 6 or alternatively be located within the interior volume of the first containment member 5.

Figure 3:
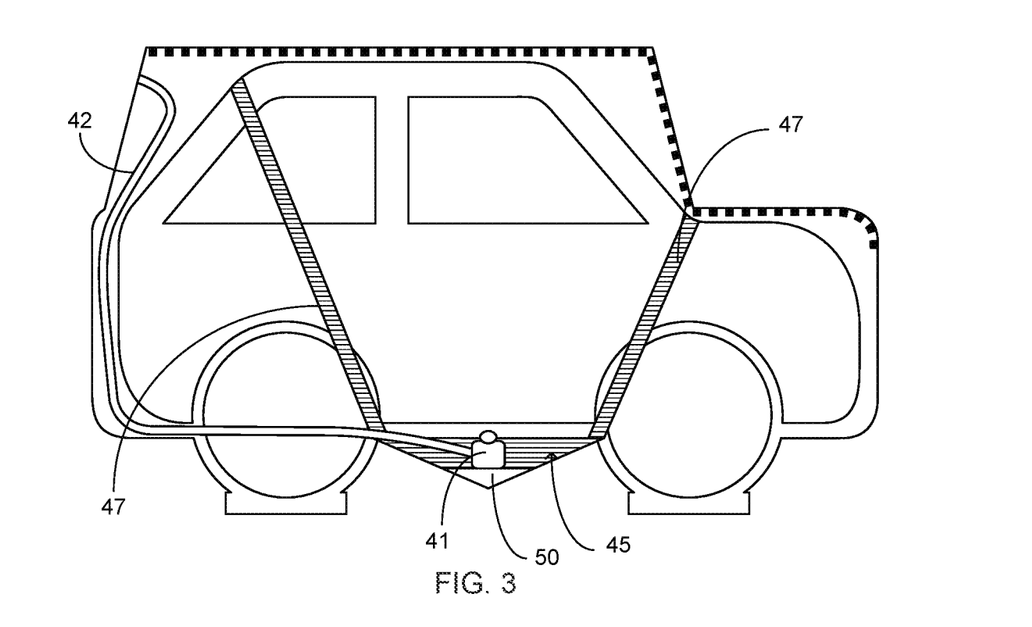
FIG. 3 is a side diagrammatic view of an embodiment of the present invention showing the pumping system thereof.
Figure 4:
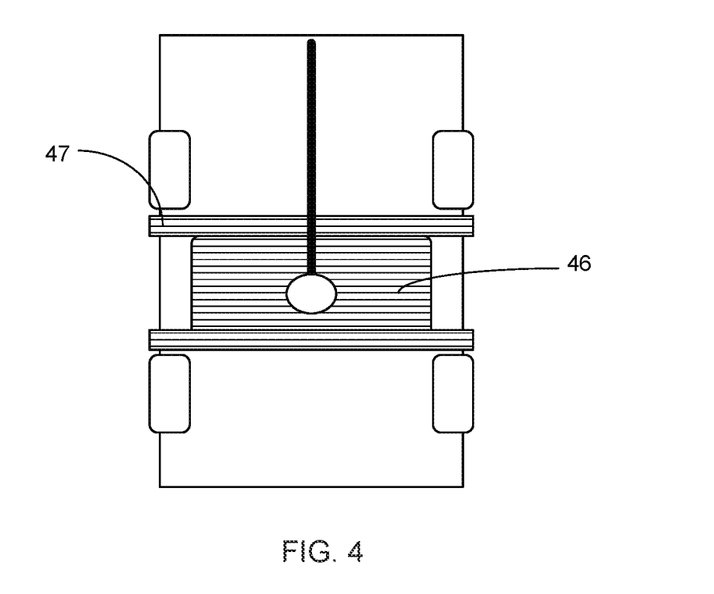
FIG. 4 is a top diagrammatic view of an embodiment of the present invention showing the pumping system thereof.
Figure 5:
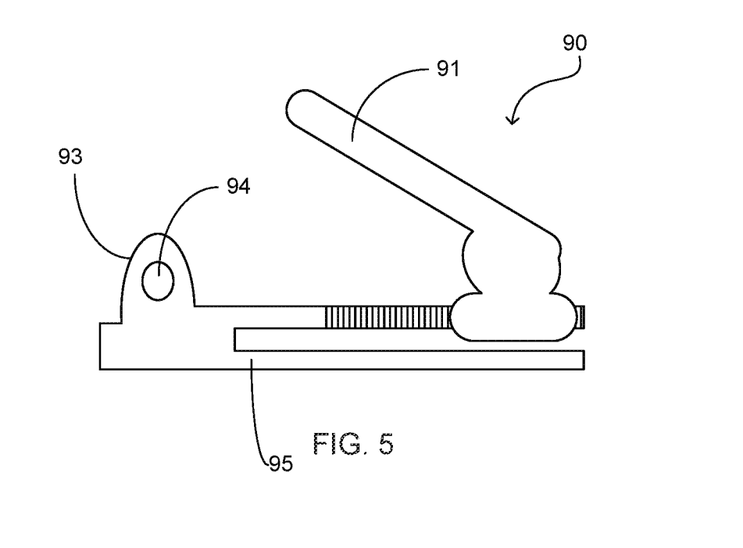
FIG. 5 is a side view of a preferred embodiment of a closure device for the closure mechanism of the present invention.
Figure 6:
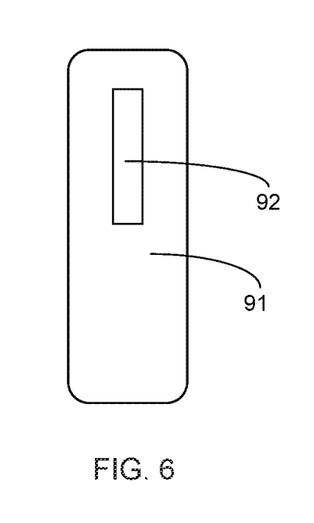
FIG. 6 is a top view of the arm member of the closure device.
Figure 7:
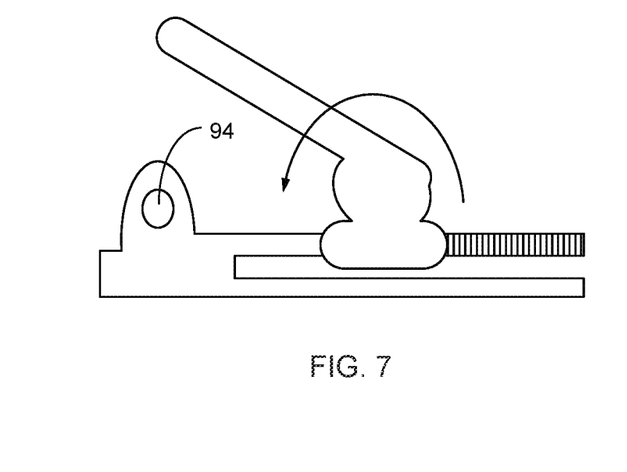
FIG. 7 is a side view of a preferred embodiment of a closure device for the closure mechanism of the present invention.
Figure 8:
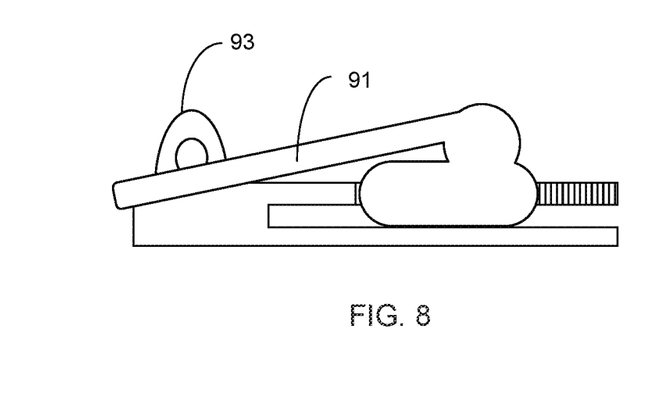
FIG. 8 is a side view of a preferred embodiment of a closure device for the closure mechanism of the present invention in a closed position.

Illustrated herein in FIG. 3 and FIG. 4, the water removal member 40 is illustrated having a mounting harness 45, wherein the mounting harness 45 is deployed to secure the water removal member 40 to the vehicle 99. The mounting harness 45 includes support member 46 that includes straps 47 configured to secure the water removal member 40 to the vehicle 99. The support member 46 and straps 47 are manufactured from a suitable material such as but not limited to nylon. A weight member 50 is secured to the support member 46 wherein the weight member 50 results in a shape of the support member 46 that is conducive to collect water. It should be understood within the scope of the present invention that the weight member 50 could be manufactured from alternate suitable materials in order to have sufficient mass to affect the shape of the support member 46 so as to facilitate collection of water in the event water egresses into the body 10. Affecting the shape of the support member 46 provides earlier evacuation of any water that has egressed into the interior volume of the body 10. The body 10 is sealably secured proximate the top thereof with sealing members 60. Both the first containment member 5 and second containment member 6 employ sealing members 60 to provide a waterproof sealing thereof. As is further discussed herein, in a preferred embodiment of the present invention, alternate types and locations of sealing members 60 are deployed in order to ensure a waterproof connection and inhibit the compromise thereof.

Illustrated in FIG. 10 through FIG. 13 herein is an alternate embodiment of the vehicle protection apparatus 200. The vehicle protection apparatus 200 includes a body 210 manufactured from a durable waterproof material such as but not limited to polyethylene. The body 10 includes a sealing member 260 that facilitates both separation of the body 210 in order to place a vehicle 99 therein and a location optimal to inhibit entry of water into the body 210. The body 210 includes a bottom portion 215 that is of suitable size to have a vehicle 99 superposed thereon. The bottom portion 215 includes integrally formed therewith four tire engagement members 220. The tire engagement members 220 provide a location to place the tires of the vehicle 99 thereon, wherein the tire engagement members 220 are manufactured from a suitable material that can accommodate engagement with the vehicle tires and any heat thereof. Ramp members 230 are additionally provided wherein the ramp members 230 are superposed the tire engagement members 220 and are operable to provide lift to the vehicle 99. It is contemplated within the scope of the present invention that the ramp members 230 are removable so as to deploy the vehicle protection apparatus 200 with or without the ramp members 230. The body 210 is configured to mateably fit to the vehicle 99 so as to permit water to flow underneath as indicated by arrow A. This contoured fit of the body 210 to the vehicle 99 further reduces the amount of air between the body 210 and the vehicle 99.

The sealing member 260 of the body 210 is located at the top of the body 210 so as to ensure maintenance of a position thereof that is above any potential waterline from rising water around the vehicle 99. As is further discussed herein, the sealing member 260 can be provided in alternate embodiments. It should be further understood within the scope of the present invention that more than one sealing member 260 can be employed in order to ensure the integrity of the sealing thereof.

Figure 9:
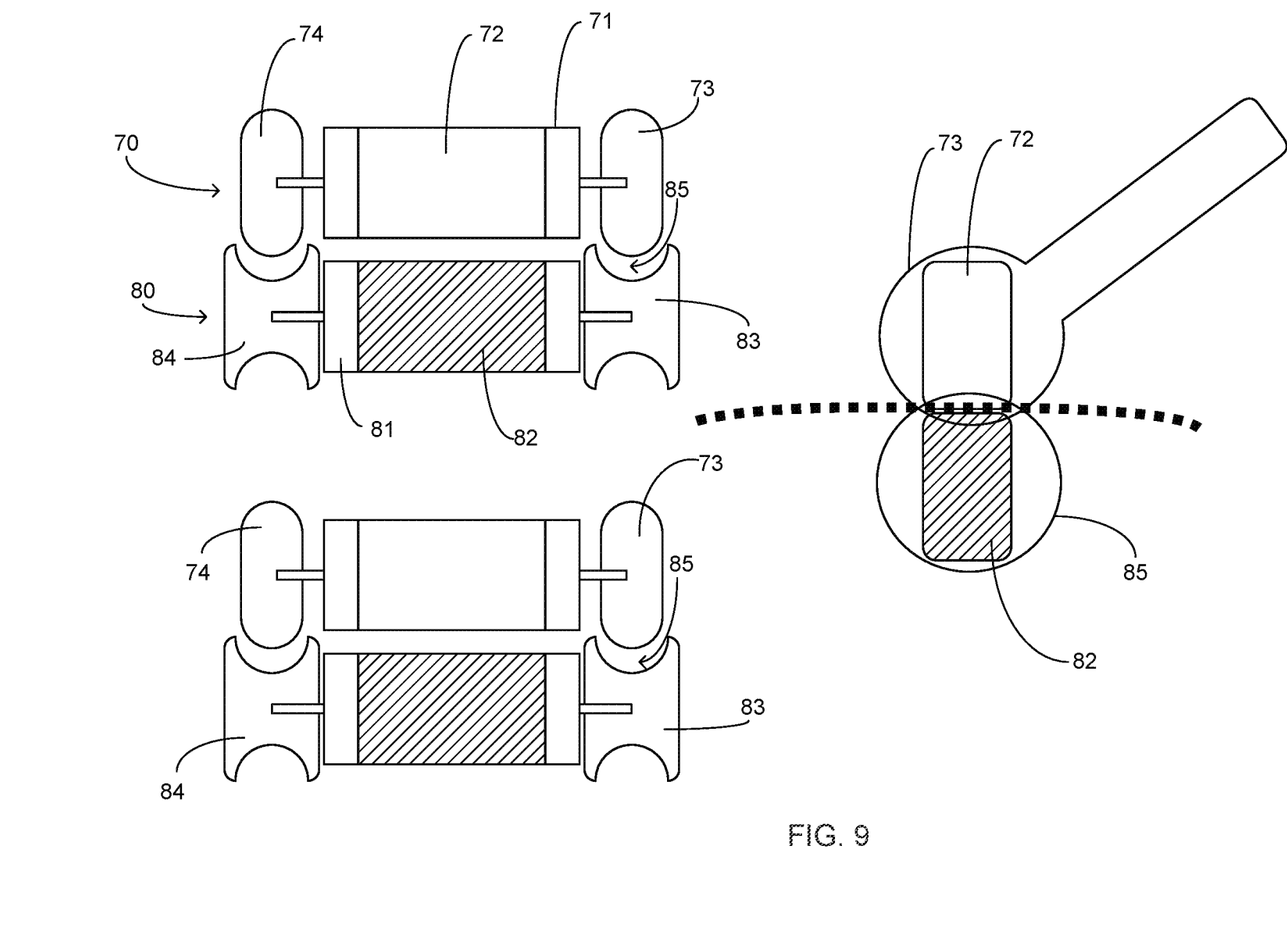
FIG. 9 is a side diagrammatic view of the second closure mechanism of the present invention.
Figure 10:
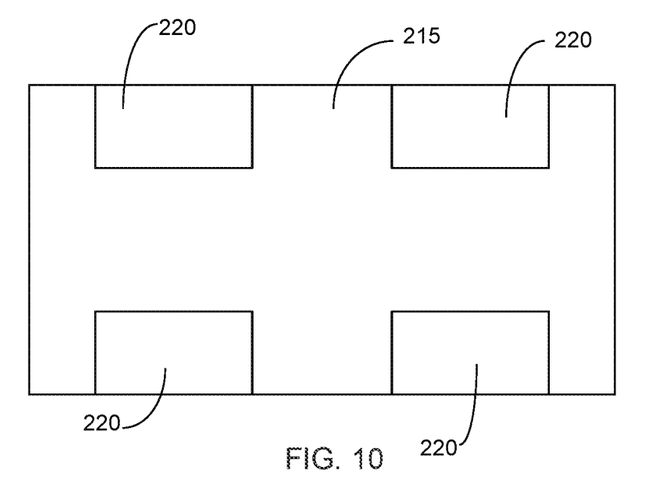
FIG. 10 is a top view of the base portion of the containment member.
Figure 11:
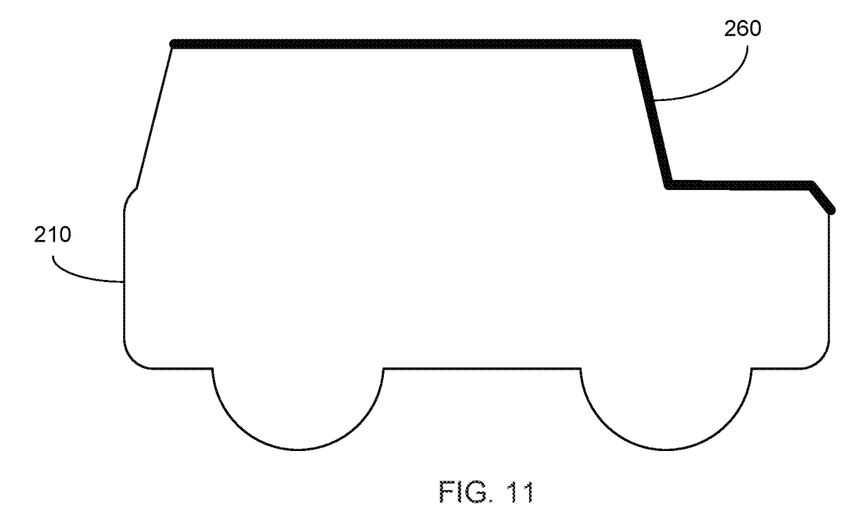
FIG. 11 is a side view of an alternate embodiment of the present invention.
Figure 12:
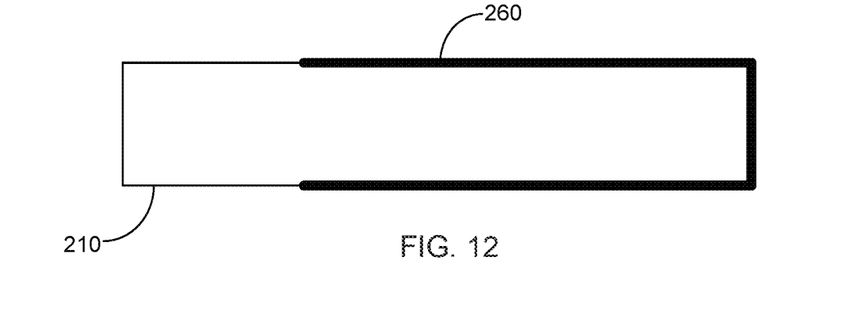
FIG. 12 is a top view of the top panel member of the alternate embodiment of the present invention.
Figure 13:
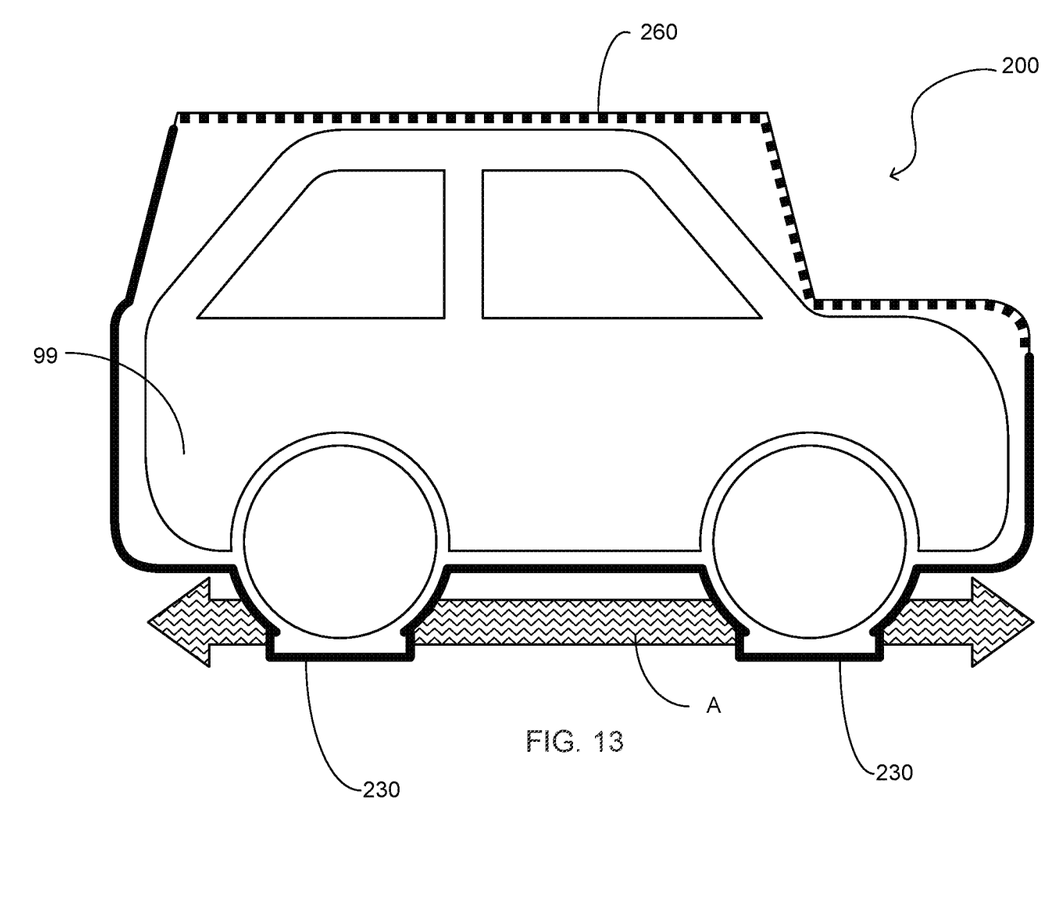
FIG. 13 is a side view of an alternate embodiment of the present invention.

Referring to FIG. 5 through FIG. 9, exemplary embodiments of the sealing members 60, 260 are illustrated therein. As is illustrated in FIG. 9, sealing members 60,260 include a first portion 70 and second portion 80. First portion 70 includes central member 71 having magnet 72 disposed therein. The central member 71 includes a first end member 73 and second end member 74 operably mounted to the central member 71 on opposing sides thereof. First end member 73 and second end member 74 are generally oval in shape and are configured to mateably couple with receiving members 83,84 of the second portion 80. The second portion 80 includes a central member 81 of the same size as central member 71. Central member 81 has disposed therein magnet member 82 wherein the polarity of the magnet member 82 is operable to couple with magnet 72. The receiving members 83,84 have an arcuate shaped cavity 85 wherein the lower ends of the first end member 73 and second end member 74 are configured to be journaled into cavity 85 providing a watertight seal therebetween. It should be understood that a plurality of adjacent first portions 70 and second portions 80 are joined so as to create a flexible sealing member 60,260 capable of providing a seal around the contours of the vehicle 99. The first end member 73 and second end member 74 rotatably engage with the receiving members 83,84 while central members 71,81 remained operably coupled.

Sealing members 60,260 employ closure member 90 to maintain closure of the sealing members 60,260. The closure member 90 is located at an end of the sealing member 60,260 and provides locking of the sealing member 60,260 in a closed position. The closure member 90 includes a base portion 95 that is manufactured from a rigid material and planar in manner. The base portion 95 has integrally formed therewith a locking member 93 wherein the locking member 93 extends upward from the base portion 95. The locking member 93 includes aperture 94 wherein aperture 94 is of suitable size to accommodate a nylon zip tie, lock or other similar device therethrough. The closure member 90 includes an arm member 91 wherein the arm member 91 is movably mounted so as to move between a first position and a second position. In a first position the arm member 91 is distal to the locking member 93 while in the second position the arm member 91 is operably coupled with the locking member 93. The arm member 91 includes aperture 92 wherein aperture 92 is of suitable size and shape to accommodate a portion of the locking member 93 therein. The locking member 93 journals through the aperture 92 of the arm member 91 sufficiently enough to provide access to aperture 94 and journal a desired locking member therethrough. While an embodiment of a closure member 90 has been illustrated and discussed herein, it is contemplated within the scope of the present invention that the sealing members 60,260 could employ various alternate designs of closure members 90 that are operable to inhibit from unwanted opening of the sealing members 60,260.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle protection apparatus that is configured to be surroundably mounted to a vehicle so as to inhibit water from propagating into the vehicle wherein the vehicle protection apparatus comprises:
 a body, said body having a base portion and an upper portion, said base portion and said upper portion being releasably secured along a portion thereof proximate a top of said body, wherein said base portion has integrally formed therewith tire engagement members, said tire engagement members being formed on opposing sides of said base portion, said tire engagement members being planar in manner and of a different material than said body and of suitable size to have a tire superposed thereon, said base portion configured to be superposed a ground surface, said body including wall members wherein said wall members are collapsible, said body having a lower perimeter edge, said body movable between a first position and a second position wherein in said first position said upper portion is partially separated from said base portion and wherein said base portion is configured to receive a vehicle superposed thereon, wherein said body further includes a plurality of securing members, said plurality of securing members being coupled to said base portion and said upper portion of said body, said plurality of securing members being manufactured from hook and loop material, said plurality of securing members configured to secure the body around the vehicle;
 at least one sealing member, said at least one sealing member being secured proximate the top of said body, said at least one sealing member having a first portion and a second portion configured to be operably coupled so as to inhibit water from egressing past said at least one sealing member, said at least one sealing member being configured to sealably secure said base portion to said upper portion so as to inhibit water from propagating into said body;
 a water removal member, said water removal member being disposed within the interior volume of said body, said water removal member operable to remove water present within the interior volume of said body, wherein said water removal member includes a pump and at least one hose wherein said at least one hose has an end proximate said top of said body; and
 a mounting harness, said mounting harness being operably coupled to the vehicle within the interior volume of said body, said mounting harness having securing straps, said mounting harness configured to retain the pump of said water removal member.

2. The vehicle protection apparatus configured to be surroundably mounted to a vehicle inhibiting water from propagating into the vehicle as recited in claim 1, wherein said mounting harness further includes a weight member, said weight member being located proximate a center of said mounting harness, said weight member having a mass that is configured to provide a shape to said mounting harness conducive for collection of water.

3. The vehicle protection apparatus configured to be surroundably mounted to a vehicle inhibiting water from propagating into the vehicle as recited in claim 2, wherein said body further incudes a plurality of anchor members operably coupled thereto, said anchor members being secured proximate the lower perimeter edge of said body, said anchor members having a weight greater than a weight of said body so as to maintain position of said body.

4. The vehicle protection apparatus configured to be surroundably mounted to a vehicle inhibiting water from propagating into the vehicle as recited in claim 3, wherein said first portion and second portion of said at least one sealing member being magnetically coupled.

* * * * *